United States Patent [19]

Nishimura et al.

[11] 4,060,389

[45] Nov. 29, 1977

[54] APPARATUS FOR USE IN THE AMMONIA SODA PROCESS OR THE AMMONIUM CHLORIDE SODA PROCESS

[75] Inventors: Yoshiki Nishimura; Kazutaka Sakiyama; Tadao Adachi; Kenji Harada, all of Shin-nanyo, Japan

[73] Assignees: Toyo Soda Manufacturing Co., Ltd.; Nihon Kinzoku Kogyo Kabushiki Kaisha, Tokyo, both of Japan

[21] Appl. No.: 647,091

[22] Filed: Jan. 7, 1976

[30] Foreign Application Priority Data

Jan. 10, 1975  Japan .................................. 50-4866
Jan. 10, 1975  Japan .................................. 50-4867

[51] Int. Cl.$^2$ .............................................. B01J 1/20
[52] U.S. Cl. .............................. 23/252 A; 75/128 N; 75/128 W
[58] Field of Search ............. 23/252 A; 423/190, 423, 423/424; 75/128 N, 128 W

[56] References Cited

U.S. PATENT DOCUMENTS

| 2,224,984 | 12/1940 | Potts et al. ........................ 23/252 A |
| 2,339,368 | 1/1944 | Bagsar ............................ 23/252 A X |
| 2,415,161 | 2/1947 | Camp ............................. 23/252 A X |
| 2,448,462 | 8/1948 | Renzoni ......................... 23/252 A X |
| 2,942,942 | 6/1960 | Hoff ..................................... 423/423 |
| 3,551,097 | 12/1970 | Brooks et al. ........................ 423/424 |
| 3,567,434 | 3/1971 | Richardson et al. .............. 75/128 N |
| 3,717,455 | 2/1973 | Hede et al. ........................ 75/128 N |
| 3,854,937 | 12/1974 | Muta et al. ......................... 75/128 N |
| 3,912,503 | 10/1975 | Schumacher et al. ........ 75/128 N X |
| 3,929,520 | 12/1975 | Hellner et al. ......................... 148/37 |

OTHER PUBLICATIONS

Hou, "Manufacture of Soda with Special Reference to the Ammonia Process", Reinhold Publishing Co., N.Y., 1942, pp. 403–409.

Metals Handbook, 8th Edition, vol. 1, "Properties and Selection of Metals," American Society for Metals.

*Primary Examiner*—Morris O. Wolk
*Assistant Examiner*—Arnold Turk
*Attorney, Agent, or Firm*—Oblon, Fisher, Spivak, McClelland & Maier

[57] ABSTRACT

An apparatus for use in the ammonia soda process or ammonium chloride soda process wherein those parts in contact with the ammoniacal brine, the mother liquor formed in the carbonation tower or the ammonium chloride mother liquor, are made of the austenitic steel consisting essentially of less than 0.05 wt. % of C; 0.1 – 2.0 wt. % of Si; 0.01 – 2.0 wt. % of Mn; 3.0 – 20.0 wt. % of Ni; 15.0 – 30.0 wt. % of Cr; 0.5 – 7.0 wt. % of Mo and the remainder iron.

5 Claims, 2 Drawing Figures

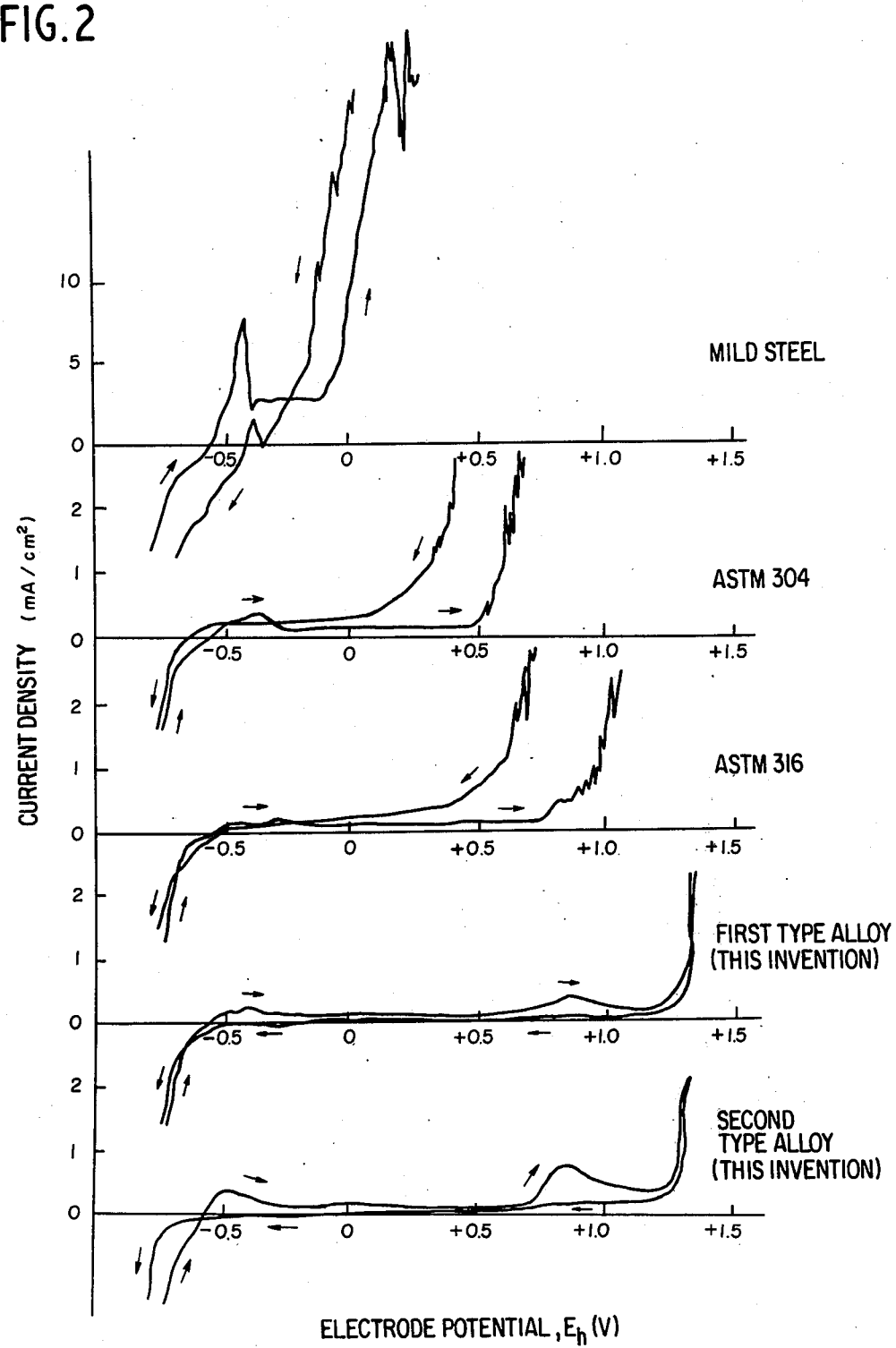

APPARATUS FOR USE IN THE AMMONIA SODA PROCESS OR THE AMMONIUM CHLORIDE SODA PROCESS

BACKGROUND OF THE INVENTION

1. Field of the Invention

The present invention relates to an apparatus for use in the ammonia soda process or the ammonium chloride soda process.

2. Description of the Prior Art

The solutions treated in the ammonia soda process or the ammonium chloride soda process include ammoniacal brines, mother liquors formed in a carbonation tower (hereinafter referred to as carbonation mother liquors) and ammonium chloride mother liquors. These solutions have high contents of NaCl, $NH_4Cl$, $NH_4OH$, $NH_4HCO_3$, $NaHCO_3$ and the like. Accordingly, the corrosiveness of these solutions is quite high resulting in corrosive environments for both processes which are similar.

The principal apparatus for treating these process solutions are carbonation towers, rotary vacuum filters, ammonia absorbers, salting-out crystallizers, cooling crystallizers, ammonia recovery towers and the like. Various materials have been tested and employed for use in these apparatus as in those portions which contact the corrosive solutions. However, a satisfactory anti-corrosive material has not yet been obtained. For example, a conventional austenitic stainless steel cannot be used in the cooling tube of a carbonation tower because of this material's inferior localized anti-corrosive properties. It is known that aluminum-silicon cast iron containing several percent of aluminum and silicon, has highly anti-corrosive properties. Unfortunately, it is disadvantageously hard to mold aluminum-silicon cast iron into proper shape for a cooling tube because of the nature of the moldability of cast iron. In the past, a calorizing steel has been widely used for preparing the cooling tube because of the low initial cost involved. However, cooling tubes made of this calorizing steel have short lifetimes because of extensive pitting. As a result, frequent replacement is required, greatly increasing both the cost and difficulty of operation. Consequently, it can be seen that a need continues to exist for an anticorrosive material for use in these apparatus.

SUMMARY OF THE INVENTION

Accordingly, it is an object of the present invention to provide an apparatus for use in the ammonia soda process or the ammonium chloride soda process in which process solutions such as ammoniacal brines, carbonation mother liquors and ammonium chlordie mother liquors can be treated with little resultant corrosion.

It is another object of the present invention to provide such an apparatus for use in the ammonia soda process or the ammonium chloride soda process which comprises a carbonation tower having a cooling tube which contacts the process solutions.

Briefly, these and other objects of the present invention as will hereinafter become clear from the ensuing discussion have been attained by providing an apparatus for use in the ammonia soda process or ammonium chloride soda process wherein those parts in contact with the ammoniacal brine, the mother liquor formed in the carbonation tower or the ammonium chloride mother liquor, are made of the austenitic steel consisting essentially of less than 0.05 wt. % of C; 0.1 – 2.0 wt. % of Si; 0.01 – 2.0 wt. % of Mn; 3.0 – 20.0 wt. % of Ni; 15.0 – 30.0 wt. % of Cr; 0.5 – 7.0 wt. % of Mo and the remainder iron.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 2 shows the polarization curves of various metals contained in the process solution removed from the fifth stage of a carbonation tower, at 40° C.

DETAILED DESCRIPTION OF THE PREFERRED EMBODIMENTS

Figure 1:
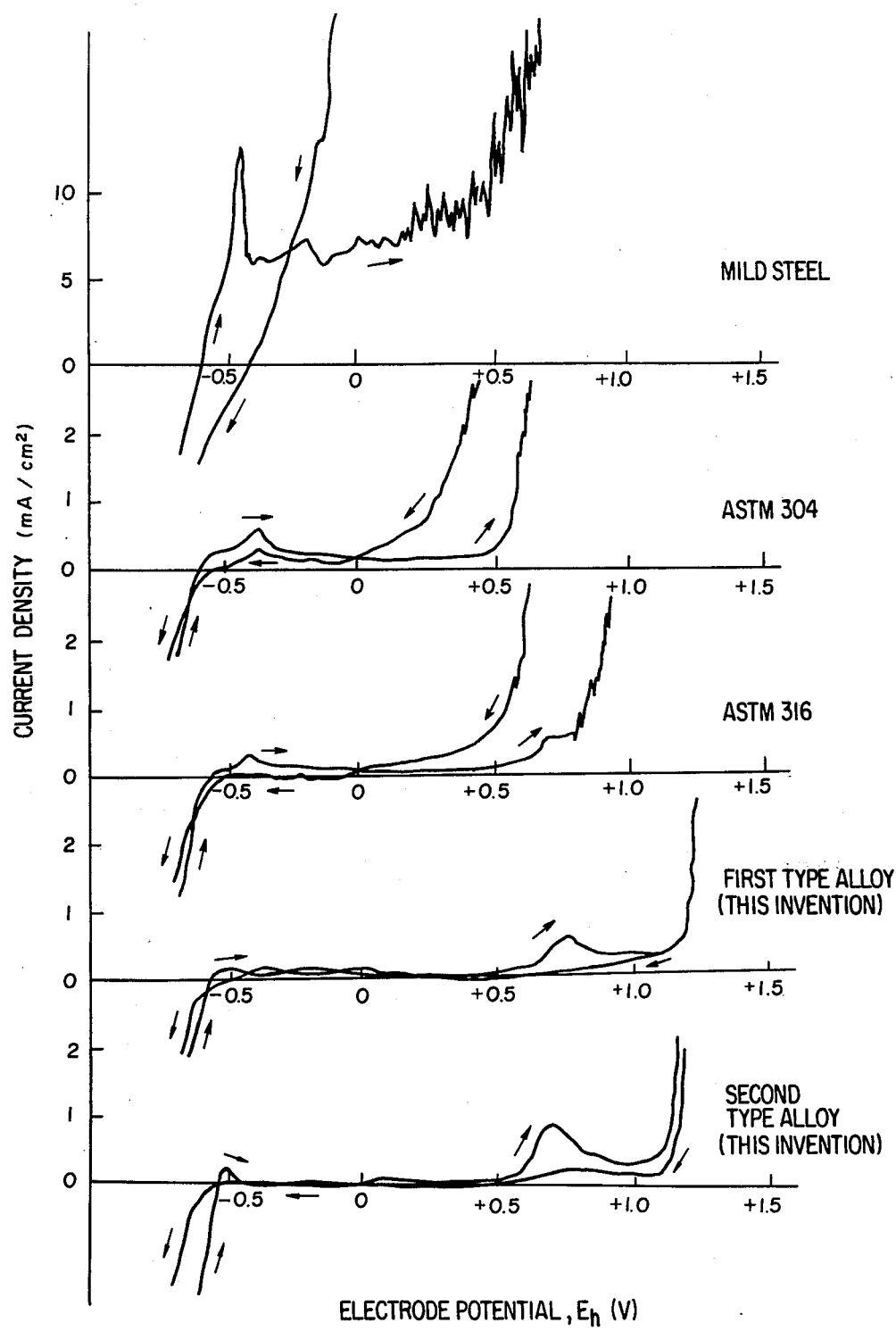
FIG. 1 shows the polarization curves of various metals contained in the process solution removed from the first stage (bottom) of a carbonation tower, at 40° C.

A preferred embodiment of the present invention provides an apparatus for use in the ammonia soda process or the ammonium chloride soda process which comprises a carbonation tower having a cooling tube made of a special austenitic steel. This austenitic steel can be classified into two types: The first type consisting essentially of less than 0.05 wt. % of C; 0.1 – 1.0 wt. % of Si; 0.2 – 2.0 wt. % of Mn; 12.0 – 20.0 wt. % of Ni; 15.0 – 22.0 wt. % of Cr; 4.0 – 7.0 wt. % of Mo and the remainder iron; and the second type (a ferrite-austenitic steel) consisting essentially of less than 0.03 wt. % of C; 0.1 – 2.0 wt. % of Si; 0.01 – 2.0 wt. % of Mn; 3.0 – 10.0 wt. % of Ni; 22.0 – 30.0 wt. % of Cr; 0.5 – 5.0 wt. % of Mo; 0.05 – 0.30 wt. % of $N_2$ and the remainder iron.

The limitations on the contents of these components are dictated by the following reasons.

The first type of austenitic steel:

C: less than 0.05 wt. %

It is preferred to maintain the C content at a minimum because carbides are crystallized at higher C contents. Small amounts of C may be included in the steel due to contamination during the manufacturing process.

Si: 0.1 – 1.0 wt. %

These amounts of Si are effective to improve the anticorrosive property, while brittleness is caused at higher Si contents.

Mn: 0.2 – 2.0 wt. %

The antipitting property deteriorates at higher Mn contents.

Ni: 12.0 – 20.0 wt. %

Ni is a principal component of the austenitic steel whereby the anticorrosive properties are promoted. However, it is difficult to form a perfect single phase austenitic steel using less than 12.0 wt. % of Ni. The cost becomes too high when greater than 20.0 wt. % is used.

Cr: 15.0 – 22.0 wt. %

The anticorrosive properties of the steel are lowered if less than 15.0 wt. % of Cr is used. The workability (ductility) becomes lowered unsatisfactorily when greater than 22.0 wt. % of Cr is used.

Mo: 4.0 – 7.0 wt. %

The antipitting corrosion properties are lowered unacceptably if less than 4.0 wt. % of Mo is included. The stability of the austenitic phase is insufficient and the cost too high if greater than 7.0 wt. % of Mo is used.

The second type of austenitic steel:

C: less than 0.03 wt. %

Higher C contents result in impact strengths at room temperature and lower temperatures, antipitting corrosion properties, corrosion cracking resistances and grain boundary attack resistances all of which are unsatisfactorily low.

Si: 0.1 – 2.0 wt. %

These amounts of Si are effective to improve the stress corrosion cracking resistance. However, an increase in weld cracking and brittleness are caused at Si contents higher than 2.0 wt. %.

Mn: 0.01 – 2.0 wt. %

Mn is effective as a de-acidifying agent and improves the hot workability in these amounts. However, the antipitting properties are deteriorated at greater than 2 wt. % of Mn.

Ni: 3.0 – 10.0 wt. %

Ni is the principal component of austenitic steel which promotes the anticorrosive properties and inhibits brittleness. These properties are insufficient at less than 3.0 wt. % of Ni. The cost becomes too high at greater than 10.0 wt. % of Ni.

Cr: 22.0 – 30.0 wt. %

Satisfactory anticorrosive properties result at greater than 22.0 wt. % of Cr. Cr is the principal component of austenitic steel for controlling the ferrite content and for improving the stress corrosion cracking resistance. However, the brittleness becomes too high and the industrial workability too low at greater than 30.0 wt. % of Cr.

Mo: 0.5 – 5.0 wt. %

The anticorrosive properties, especially the antipitting properties, are high at Mo contents greater than 0.5 wt. %. However, the workability is too low, the sigma brittleness too high and the cost too high at greater than 5 wt. % of Mo.

$N_2$: 0.05 – 0.3 wt. %

Grain growth can be inhibited and the mechanical properties improved by addition of a small amount of $N_2$ in the range of 0.05 – 0.3 wt. %.

The superior effects resulting from the use of the apparatus of this invention in the ammonia soda process will be illustrated. This apparatus comprises a carbonation tower having a cooling tube made of the first type of austenitic steel. It is compared with tubes made of the conventional calorizing steel and the conventional austenitic stainless steel. This test is provided for purposes of illustration only and is not meant to be limiting unless otherwise specified.

In a carbonation tower, carbon dioxide gas is fed into an ammoniacal brine (a saturated brine containing ammonia) which is fed from the top of the tower, thereby effecting a reaction producing sodium bicarbonate and ammonium chloride. In the tower, scores of multistage cast iron rings are arranged, and shell-and-tube type coolers are disposed in each stage in the lower part of the tower.

The following table shows the compositions of the ammoniacal brine fed into the top of the tower and the mother liquor discharged from the bottom of the tower (freed from sodium bicarbonate).

|  | Ammoniacal brine (g/l) | Carbonation mother liquor (g/l) |
| --- | --- | --- |
| Free $NH_3$ | 70 – 90 | 20 – 30 |
| Combined $NH_3$ | 0 – 35 | 50 – 75 |
| NaCl | 190 – 260 | 60 – 80 |
| $CO_2$ | 30 – 50 | 40 – 50 |
| pH | 9.0 – 9.5 | 7.2 – 8.0 |

The process solution in the carbonation tower contains ammonia and a large amount of chloride ions. Accordingly, the corrosion of the carbonation tower is severe. In the tower, the precipitation of sodium bicarbonate is intensified thereby increasing the severity of local corrosion and shortening the lifetime of the material of which the cooling tubes are formed. The amount of corrosion depends upon the progress of the reaction whose degree of progress increases at the lower portion.

The following tests were performed: Cooling tubes made of conventional calorizing steel were inserted in each of the multistages of the carbonation tower. In the bottom stage and the next four lowest ones, wherein the most severe corrosion is caused, cooling tubes made of the specific austenitic steel of the invention (C: 0.04 wt. %; Si: 0.58 wt. %; Mn: 1.55 wt. %; Ni: 16.45 wt. %; Cr: 17.82 wt. %; Mo: 5.13 wt. % and remainder of Fe) were inserted. The process was performed under both conditions and anticorrosive tests were conducted. As a result, the lifetime of the cooling tubes made of the calorizing steel was short because of the precipitation of C, Si and Mn in the form of prismatic crystals and the onset of corrosion caused by the deflection of the precipitated crystals from the tube walls. The cooling tube made of the calorizing steel inserted in the bottom-most five stages suffered especially severe pitting. On the other hand, the cooling tubes made of the specific austenitic steel of this invention placed in the same five lower stages exhibited no corrosion without any effects from deflection. According to the results of acceleration tests, it has been determined that the lifetime of the former conventional tube is about 1 – 3 years, but that the latter tube of this invention does not display any damage even after 12 years of operation.

When cooling tubes made of the second type austenitic steel of this invention (C: 0.03 wt. %; Si: 0.35 wt. %; Mn: 0.32 wt. %; Ni: 4.86 wt. %; Cr: 24.85 wt. %; Mo: 1.53 wt. %; $N_2$: 0.15 wt. %; remainder Fe) were inserted at the same five lower stages of the carbonation tower, it was found that the cooling tubes could still be used even after 3 years of operation, although slight local corrosion does occur according to acceleration tests.

Experimental tests of the various materials will be illustrated, with reference to FIGS. 1 and 2, which show respectively polarization curves of various metals treated with process solutions removed from the bottom stage and the fifth stage from the bottom of carbonation towers whose tubes are formed from the materials mentioned above at 40° C. The results for mild steel are also shown. The compositions of the process solutions were as follows.

|  | First stage (g/l) | Fifth stage (g/l) |
|---|---|---|
| Free $NH_3$ | 27 | 30 |
| Combined $NH_3$ | 70 | 67 |
| NaCl | 80 | 84 |
| $CO_2$ | 46 | 50 |
| pH | 7.5 | 7.6 |

As is clear from the polarization curves in the Figures the first and the second type austenitic steels of this invention (having the above-mentioned compositions) produced solutions which maintained a passive state and were not activated by raising or lowering the electrode potential. On the contrary, the conventional austenitic stainless steels ASTM 304 and ASTM 316 produced solutions which easily caused anodic dissolution when the passive state was once broken. In the case of a potential drop, dissolution currents were observed even for low potentials. The remarkable anticorrosive properties of the specific austenitic steels of this invention to the process solutions can be seen from the polarization phenomena in the activation zone. This fact demonstrates the superior anticorrosive properties, i.e., little, if any, metal values are found.

As stated above, the specific autstenitic steels of this invention display excellent anticorrosive properties to the process solutions in the carbonation tower in both practical tests and experimental tests. Using these materials, the cost of the cooling tubes of the carbonation tower can be remarkably decreased. Operation difficulties caused by a need for replacing the cooling tubes due to corrosion are obviated. Moreover, the thickness of the cooling tubes of this invention can be decreased because of the high anticorrosive properties. In addition, the heat transfer effect of the tubes is improved because no accumulation of precipitates and other dust occurs since the inner surface of the tubes (the cooling water side) does not corrode. Furthermore, it is also advantageous to use thin cooling tubes from the viewpoints of convenience of installation and replacement of the cooling tubes.

The remarkable superiority of an apparatus for use in the ammonia soda process or ammonium chloride soda process which comprises a carbonation tower having cooling tubes made of the specific austenitic steel of this invention has been illustrated. Of course, this specific austenitic steel can also be effectively used in other parts of the apparatus which come into contact with the process solutions of the ammonia soda process or ammonium chloride soda process.

Having now fully described the invention, it will be apparent to one of ordinary skill in the art that many changes and modifications can be made thereto without departing from the spirit or scope of the invention as set forth herein.

What is claimed as new and intended to be covered by letters patent is:

1. In an apparatus having parts intended for contact with an ammoniacal brine, a mother liquor formed in the carbonation tower of an ammonia soda process, an ammonium chloride soda process solution or an ammonium chloride mother liquor, the improvement wherein the surfaces of said parts comprise an austenitic steel consisting essentially of less than 0.05 wt. % of C; 0.1 - 2.0 wt. % of Si; 0.01 - 2.0 wt. % of Mn; 3.0 - 20.0 wt. % of Ni; 15.0 - 30.0 wt. % of Cr; 0.5 - 7.0 wt. % of Mo and the remainder iron.

2. The apparatus of claim 1, wherein said parts are made of the austenitic steel consisting essentially of less than 0.05 wt. % of C; 0.1 - 1.0 wt. % of Si; 0.2 - 2.0 wt. % of Mn; 12.0 - 20.0 wt. % of Ni; 15.0 - 22.0 wt. % of Cr; 4.0 - 7.0 wt. % of Mo and the remainder iron.

3. The apparatus of claim 2, wheren said parts are cooling tubes of a carbonation tower.

4. In an apparatus having surfaces intended for contact with an ammoniacal brine, a mother liquor formed in a carbonation tower of an ammonia soda process, ammonium chloride soda process solution, or ammonium chloride mother liquor, the improvement wherein said surfaces comprise a ferrite-austenitic steel consisting of less than 0.03 wt. % of C; 0.1 - 2.0 wt. % of Si; 0.01 - 2.0 wt. % of Mn; 3.0 - 10.0 wt. % of Ni; 22.0 - 30.0 wt. % of Cr; 0.5 - 5.0 wt. % of Mo; 0.05 - 0.30 wt. 1 of $N_2$ and the remainder iron.

5. The apparatus of claim 4, wherein said surfaces are surfaces of cooling tubes of a carbonation tower.

* * * * *